United States Patent
Lin et al.

(10) Patent No.: US 10,474,354 B2
(45) Date of Patent: Nov. 12, 2019

(54) WRITING GESTURE NOTIFICATION METHOD AND ELECTRONIC SYSTEM USING THE SAME

(71) Applicant: ASUSTeK COMPUTER INC., Taipei (TW)

(72) Inventors: Hung-Yi Lin, Taipei (TW); Yi-Lun Lai, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/854,093

(22) Filed: Dec. 26, 2017

(65) Prior Publication Data
US 2018/0188942 A1 Jul. 5, 2018

(30) Foreign Application Priority Data
Dec. 30, 2016 (TW) .............................. 105144275 A (51) Int. Cl.
*G06F 3/0488* (2013.01)
*G06F 3/0354* (2013.01)
*G06F 3/041* (2006.01)
*G06F 3/044* (2006.01)

(52) U.S. Cl.
CPC ...... *G06F 3/04883* (2013.01); *G06F 3/03545* (2013.01); *G06F 3/0412* (2013.01); *G06F 3/0414* (2013.01); *G06F 3/0418* (2013.01); *G06F 3/044* (2013.01)

(58) Field of Classification Search
CPC .............. G06F 3/04883; G06F 3/03545; G06F 3/0414; G06F 3/0412
See application file for complete search history.

(56) References Cited

U.S. PATENT DOCUMENTS

| 8,988,398 B2 * | 3/2015 | Cao ....................... G06F 3/0383 345/158 |
| 9,063,588 B2 | 6/2015 | Buelow et al. |
| 9,195,351 B1 * | 11/2015 | Rosenberg ............ G06F 1/1626 |
| 9,575,573 B2 | 2/2017 | Chang |
| 2006/0256082 A1 * | 11/2006 | Cho ....................... G06F 1/1626 345/156 |

(Continued)

FOREIGN PATENT DOCUMENTS

| CN | 102609116 A | 7/2012 |
| CN | 205103788 U | 3/2016 |
| TW | 201504929 A | 2/2015 |

*Primary Examiner* — Hien L Duong
(74) *Attorney, Agent, or Firm* — McClure, Qualey & Rodack, LLP (57) ABSTRACT

A writing gesture notification method is provided. The writing gesture notification method, applied to an electronic device of an electronic system, the electronic system includes the electronic device and an input device, the writing gesture notification method comprising: obtaining input information from the input device; obtaining first contact information and orientation information of the input device from the input device; sensing second contact information via the electronic device; comparing the input information, the first contact information, the orientation information and the second contact information with preset information to generate a comparison result; and providing a notification via the electronic device according to the comparison result.

10 Claims, 8 Drawing Sheets

(56) References Cited

U.S. PATENT DOCUMENTS

| | | | |
|---|---|---|---|
| 2009/0267896 A1* | 10/2009 | Hiramatsu | G06F 3/03545 345/157 |
| 2011/0298709 A1* | 12/2011 | Vaganov | G06F 3/03545 345/158 |
| 2012/0158629 A1* | 6/2012 | Hinckley | G06F 3/038 706/15 |
| 2013/0106714 A1* | 5/2013 | Shahparnia | G06F 1/3203 345/173 |
| 2013/0106718 A1 | 5/2013 | Sundara-Rajan | |
| 2014/0092069 A1* | 4/2014 | Bentov | G06F 1/26 345/179 |
| 2014/0210797 A1* | 7/2014 | Kreek | G06F 3/0488 345/179 |
| 2014/0253521 A1* | 9/2014 | Hicks | G06F 3/03545 345/179 |
| 2015/0015489 A1* | 1/2015 | Vaganov | G06F 3/03545 345/158 |
| 2015/0363011 A1* | 12/2015 | Kelso | G06F 3/03545 345/179 |
| 2015/0363034 A1* | 12/2015 | Hinckley | G06F 3/0414 345/173 |
| 2015/0363035 A1* | 12/2015 | Hinckley | G06F 3/0383 345/173 |
| 2016/0299606 A1* | 10/2016 | Go | G06F 3/046 |
| 2017/0131840 A1* | 5/2017 | Deichmann | G06F 3/0412 |
| 2017/0357338 A1* | 12/2017 | Bell | G06F 3/03545 |
| 2018/0081455 A1* | 3/2018 | Huston | G06F 3/03545 |
| 2018/0188942 A1* | 7/2018 | Lin | G06F 3/0418 |

* cited by examiner

WRITING GESTURE NOTIFICATION METHOD AND ELECTRONIC SYSTEM USING THE SAME

CROSS-REFERENCE TO RELATED APPLICATION

This application claims the priority benefit of TW application serial No. 105144275, filed on Dec. 30, 2016. The entirety of the above-mentioned patent application is hereby incorporated by references herein and made a part of specification.

BACKGROUND OF THE INVENTION

Field of the Invention

The disclosure relates to a notification method and a system and, more specifically, relates to a writing gesture notification method and an electronic system using the same.

Description of the Related Art

With the rapid development of touch technology, touch devices are widely used in and become more and more important. Touch devices includes touch input devices and touch input panels. The touch input device (such as a touch stylus) can be used to write on the touch panel comfortably. Then, user experience is improved.

BRIEF SUMMARY OF THE INVENTION

According to a first aspect, a writing gesture notification method is provided. The writing gesture notification method, applied to an electronic device of an electronic system, the electronic system includes the electronic device and an input device, the writing gesture notification method comprising: obtaining input information from the input device; obtaining first contact information and orientation information of the input device from the input device; obtaining second contact information via the electronic device; comparing the input information, the first contact information, the orientation information and the second contact information with preset information to generate a comparison result; and providing a notification via the electronic device according to the comparison result.

According to a second aspect, an electronic system is provided. The electronic system comprising: an input device configured to generate input information, first contact information and orientation information of the input device; and an electronic device configured to receive the input information, the first contact information and the orientation information from the input device, and sense second contact information via a sensing panel of the electronic device, wherein the electronic device compares the input information, the first contact information, the orientation information and the second contact information with preset information to generate a comparison result, and provides a notification according to the comparison result.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

These and other features, aspects, and advantages of the disclosure will become better understood with regard to the following description, appended claims, and accompanying drawings. However, the embodiments are not limited herein. The description of the operation of components is not used for limiting the execution sequence. Any equivalent device with the combination according to the disclosure is in the scope of the disclosure. The components shown in figures are not used to limit the size or the proportion. The same or similar numbers denote the same or similar components or steps.

Unless specifically noted, terms used in the whole specification and the claims have common meanings in the art, in the disclosure, or in the special content. Some words used to describe the present disclosure will be discussed below or elsewhere in the specification, so as to provide additional guidance to those skilled in the art on the description of the present disclosure.

The terms "comprising", "including", "having", and so on, are open-ended. Moreover, the term "and/or" includes one or more of the listed items and combinations thereof.

In the text, the terms "connect" or "couple" means "electrically connect" or "electrically couple". The technology "connect" or "couple" also means the interaction or cooperation between/among two or more components.

Figure 1:
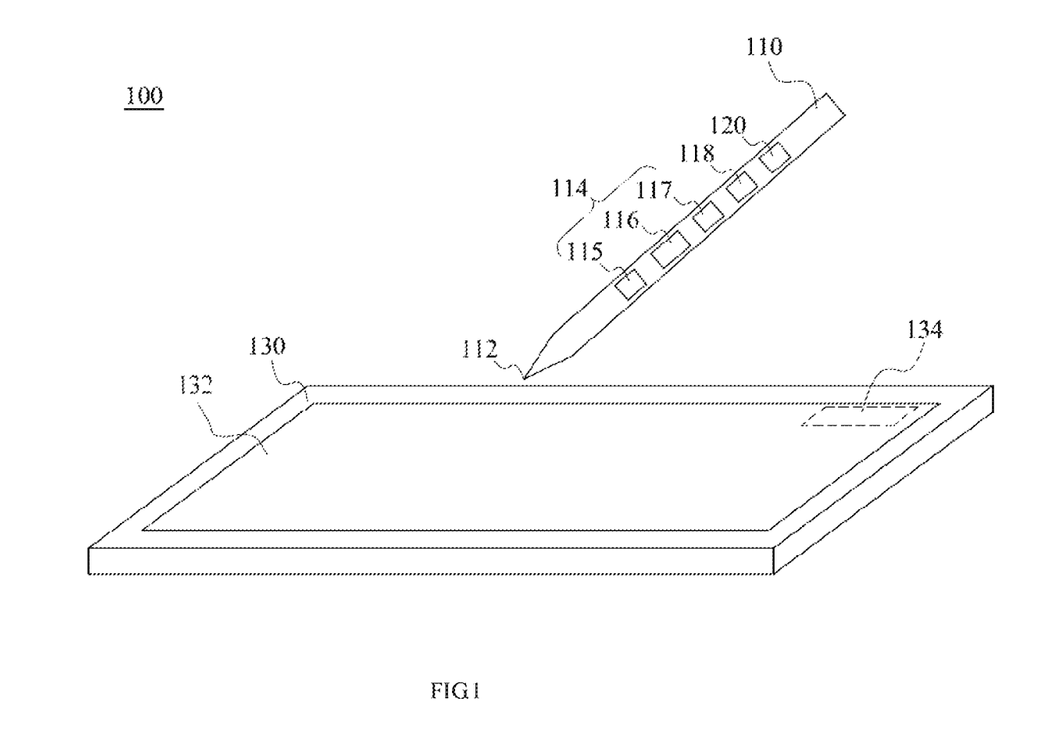
FIG. 1 is a schematic diagram showing an electronic system in an embodiment.

FIG. 1 is a schematic diagram showing an electronic system 100 in an embodiment. Please refer to FIG. 1. In an embodiment, an electronic system 100 includes an input device 110 and an electronic device 130. The electronic device 130 includes a sensing panel 132. The input device 110 is configured to generate input information, first contact information and orientation information of the input device 110. The electronic device 130 is configured to receive the input information, the first contact information and the orientation information from the input device 110. Second contact information is sensed via the sensing panel 132 of the electronic device 130. Then, the input information, the first contact information, the orientation information and the second contact information are compared with preset information by the electronic device 130 to generate a comparison result. A notification is provided according to the comparison result. In an embodiment, the input device 110 is a touch stylus or another touch input device. The electronic device 130 is a touch sensing device which supports touch applications, such as a smart phone, a tablet computer, and a touch television.

In an embodiment, the input information is a writing result when the user operates the input device 10 to write on the sensing panel 132. The first contact information is a contact pressure of a contact position where the input device 110 contacts the sensing panel 132 when the user operates the input device 10 to write on the sensing panel 132, or a contact position where the user contacts the input device 110 when the input device 110 is operated by the user. The orientation information is an incline angle or an incline direction when the input device 110 is operated by the user. The second contact information is a contact position where the user contacts the sensing panel 132 or a contact pressure when the user operates the input device 10 to write on the sensing panel 132.

In an embodiment, the input device 110 includes a sensor 114, a wireless module 118 and a first processor 120. The input device 110 senses the first contact information and the orientation information of the input device 110 via the sensor 114. The first contact information and the orientation information are processed via the first processor 120. Then, the processed first contact information and the orientation information are sent to the electronic device 130 via the wireless module 118. In the embodiment, as shown in FIG. 1, the input device 110 is a touch stylus. As a result, the user operates the input device 110 to write on the sensing panel 132 to generate the input information. In an embodiment, the input information is a writing result when the user operates the input device 110 to write on the sensing panel 132.

Figure 3A:
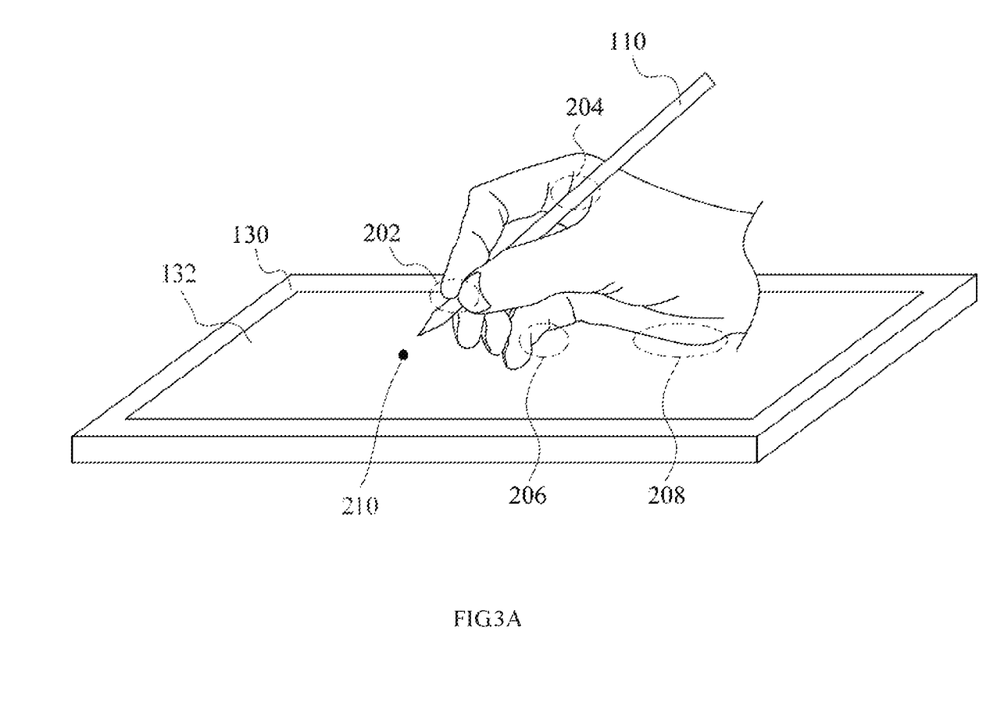
FIG. 3A, FIG. 3B and FIG. 3C are schematic diagrams showing an electronic system in an embodiment.

In an embodiment, the sensor 114 includes a touch sensor 115, a contact sensor 116 and a direction sensor 117. The input device 110 senses the first contact information via the touch sensor 115 and the contact sensor 116, and senses the orientation information via the direction sensor 117. In an embodiment, the touch sensor 115 is a resistive touch sensor, a capacitive touch sensor, an inductive touch sensor. The direction sensor 117 is an acceleration sensor, a gyro sensor, a magnetic sensor. As a result, the touch sensor 115 is configured to sense the contact position where the user contacts the input device 110 when the user operates the input device 110 to write on the sensing panel 132. The contact sensor 116 is configured to sense the contact pressure of the contact position where the input device 110 contacts the sensing panel 132 (as shown in FIG. 3A, the contact position 210 is between a tip 112 of the input device 110 and the sensing panel 132), or is configured to sense the contact pressure of the contact position where the user contacts the input device 110 (as shown in FIG. 3A, the contact position 202 is between the user and the input device 110). The direction sensor 117 is configured to sense the incline angle and the incline direction when the input device 110 is operated.

In an embodiment, the electronic device 130 compares the input information, the first contact information, the orientation information and the second contact information with preset information to generate a comparison result, and notices the user to adjust the writing gesture according to the comparison result. In an embodiment, the preset information is a preset standard writing gesture stored in the electronic device 130. In other embodiment, a user with a standard writing gesture operates the electronic system 100 first, and then the electronic device 130 stores and takes the standard writing gesture of the user as the preset information. In an embodiment, the comparison result is generated after the comparison via the second processor 134 built-in the electronic device 130. Then, a notification is provided according to the comparison result.

Figure 2A:
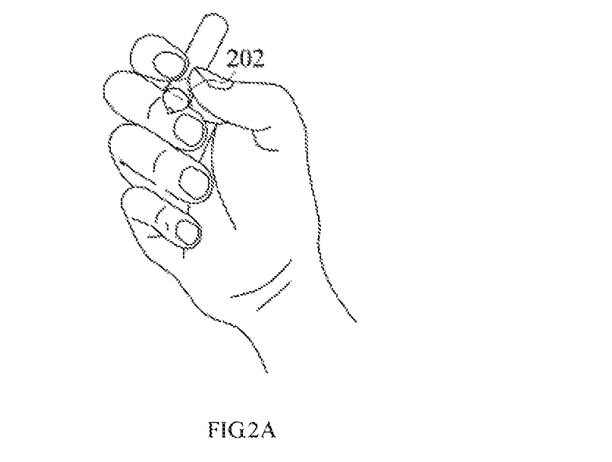
FIG. 2A, FIG. 2B and FIG. 2C are schematic diagrams showing contact positions between a user and an electronic system in an embodiment.
Figure 2B:
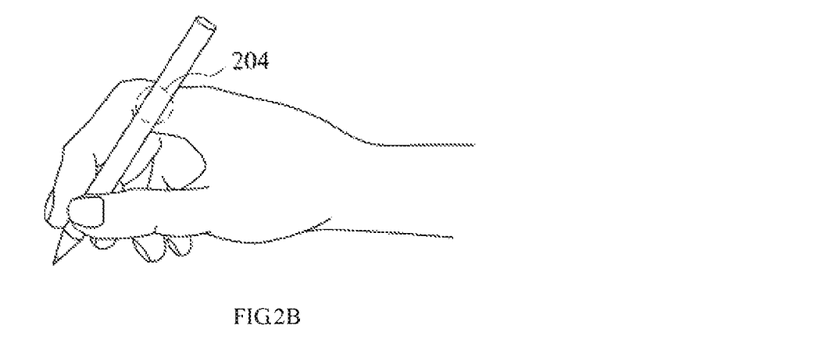

In an embodiment, the electronic device 130 determines the contact position that the input device 110 is touched according to the first contact information, and compares the contact position with a preset position in the preset information. Please refer to FIG. 2A and FIG. 2B. FIG. 2A and FIG. 2B are schematic diagrams showing contact positions where a user contacts an electronic system 100 in an embodiment. When the user operates the input device 110 to write on the sensing panel 132, the user contacts the input device 110 at the contact position 202 (as shown in FIG. 2A) and the contact position 204 (as shown in FIG. 2B). The contact position 202 and the contact position 204 correspond to the writing gesture of the user. In other words, a thumb, an index finger and a middle finger of the user contacts a bottom part of the input device 10 at the contact position 202. The upper part of the index finger of the user contacts an upper part of the input device 110 at the contact position 204. As a result, the electronic device 130 compares the contact position 202 with a first preset position in the preset information, and compares the contact position 204 with a second preset position in the preset information. Then, a difference between the writing gesture of the user and the preset information is determined to generate the comparison result.

In an embodiment, the electronic device 130 determines the incline angle and the incline direction of the input device 110 according to the orientation information, and compares the incline angle and the incline direction with the preset angle and preset direction of the preset information. In an embodiment, when the input device 110 is operated by the user, the incline angle and the incline direction are formed between the input device 110 and a horizontal line. The incline angle and the incline direction correspond to the writing gesture of the user. The electronic device 130 compares the incline angle and the incline direction of the input device 110 with the preset angle and the preset direction in the preset information. Then, the difference between the writing gesture of the user and the preset information is determined to generate the comparison result.

Figure 2C:
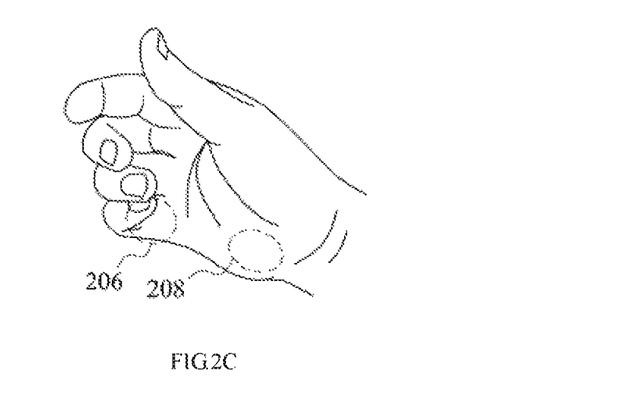
Figure 3B:
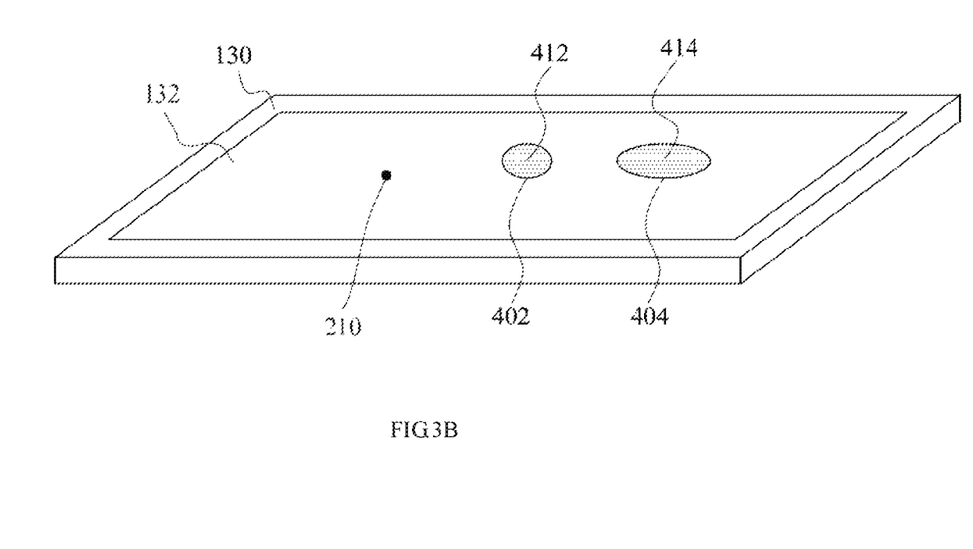

In an embodiment, the electronic device 130 calculates a pressure fulcrum on the sensing panel 132 of the electronic device 130 according to the second contact information, and compares the pressure fulcrum with a preset fulcrum in the preset information. Please refer to FIG. 2C, FIG. 3A and FIG. 3B. FIG. 2C is schematic diagram showing contact position between a user and an electronic system 100 in an embodiment. FIG. 3A and FIG. 3B are schematic diagrams showing an electronic system 100 in an embodiment. When the user operates the input device 110 to write on the sensing panel 132, the user contacts the sensing panel 132 at the contact position 206 and the contact position 208 (as shown in FIG. 2C and FIG. 3A). A contact pattern 402 and a contact pattern 404 (as shown in FIG. 3B) are generated correspondingly by the electronic device 130 according to the contact position 206 and the contact position 208. In the embodiment, the contact fulcrum is defined as an area with a biggest contact pressure of the contact position (as shown in FIG. 3A, the contact position 206 or the contact position 208) between the user and the sensing panel 132.

Then, the electronic device 130 calculates the first pressure fulcrum 412 and the second pressure fulcrum 414 according to the contact pattern 402 and the contact pattern 404. The first pressure fulcrum 412 and the second pressure fulcrum 414 correspond to the writing gesture of the user. The electronic device 130 compares the first pressure fulcrum 412 with the first preset fulcrum in the preset information, and compares the second pressure fulcrum 414 with the second preset fulcrum in the preset information. Then, the difference between the writing gesture of the user and the preset information is determined to remind the user to adjust the writing gesture. In the embodiment, when the user contacts the sensing panel 132 at the contact position 206 and the contact position 208, a sensing capacitance corresponding to the contact position 206 and the contact position 208 is generated on the sensing panel 132. The contact pattern 402 and the contact pattern 404 correspond to the area defined by the sensing capacitance. As a result, a sensing curved surface is established via the contact pattern 402 and the contact pattern 404, and a position with the biggest energy in the sensing curved surface of the contact pattern 402 and that of the contact pattern 404 are calculated. Then, the first pressure fulcrum 412 and the second pressure fulcrum 414 are generated. The way for calculating the first pressure fulcrum 412 and the second pressure fulcrum 414 is not limited herein.

In an embodiment, the electronic device 130 calculates the panel pressure on the sensing panel 132 of the electronic device 130 according to the second contact information. The panel pressure is compared with a preset panel pressure in the preset information. In an embodiment, the electronic device 130 includes a contact sensitive substrate (not shown). The contact sensitive substrate is configured to sense the panel pressure of the contact position where the user contacts the sensing panel 132 (such as, the contact position 206 or the contact position 208). The panel pressure of the contact position where the user contacts the sensing panel 132 is corresponding to the writing gesture of the user. In other words, the panel pressure of the contact position 206 and the contact position 208 is sensed by the contact sensitive substrate. As a result, the electronic device 130 compares the panel pressure of the contact position 206 and the contact position 208 where the user contacts the sensing panel 132 with the first preset panel pressure and the second preset panel pressure in the preset information, respectively. Then, the difference between the writing gesture of the user and the preset information is determined to generate the comparison result.

In an embodiment, when the contact sensitive substrate is configured to sense the panel pressure of the contact position (such as, the contact position 206 or the contact position 208) where the user contacts the sensing panel 132, the electronic device 130 calculates the pressure fulcrum according to the panel pressure of the contact position where the user contacts the sensing panel 132. In an embodiment, the electronic device 130 calculates the first pressure fulcrum 412 and the second pressure fulcrum 414 according to the panel pressure of the contact position 206 and the contact position 208, respectively. The first pressure fulcrum 412 and the second pressure fulcrum 414 are the positions with the biggest panel pressure in the contact position 206 and the contact position 208, respectively.

In an embodiment, the notification of the electronic device 130 is shown via a score table of the writing gesture for users. In an embodiment, the score table of the writing gesture is a score table with scores of a plurality of scoring items (such as stoke and strength scores when writing fonts and a holding gesture scores) and generated according to the comparison result, which is not limited herein. As a result, users easily know which item of his writing gesture has a big difference with the standard writing gesture according to the notification of the electronic device 130. Then, the user pays more attention to the item with big difference in writing.

In an embodiment, a score range, the number of scoring items and contents of the scoring items corresponding to the score table of the writing gesture of the user are adjusted according to actual requirements. In an embodiment, the score range corresponding to the score table of the writing gesture is from 0 to 10 (that is, the lowest score is 0 and the highest score is 10). Table 1 is an example of the score table of the writing gesture for users. In an embodiment, the score table of the writing gesture is displayed on the electronic device 130.

TABLE 1 score table of writing gesture

| scoring items of the writing gesture of the user | score of the writing gesture of the user |
|---|---|
| writing stoke | 8 |
| writing strength | 9 |
| holding gesture of stylus | 6 |

Figure 3C:
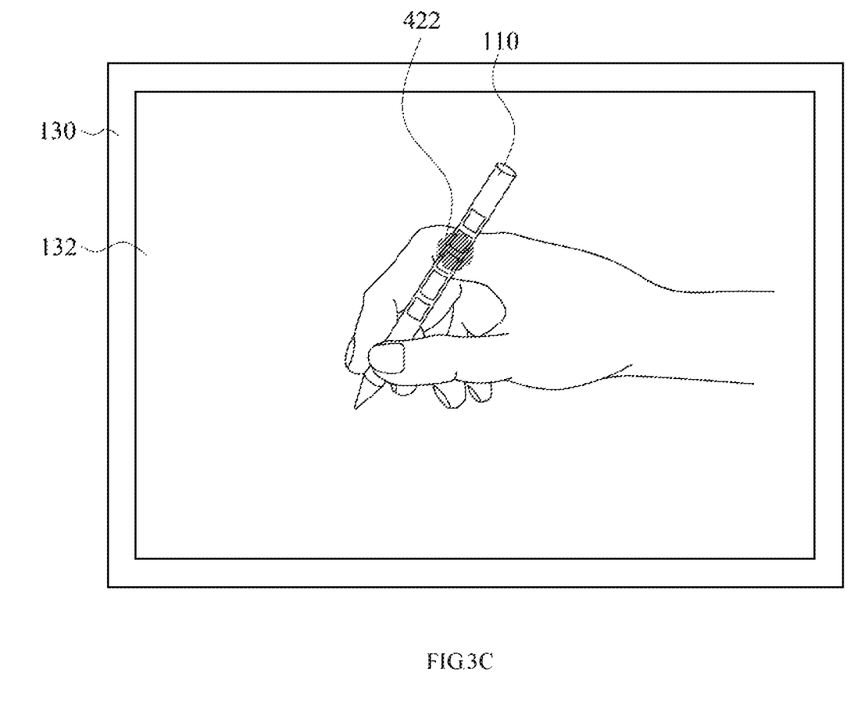

FIG. 3C is schematic diagram showing an electronic system 100 in an embodiment. In an embodiment, the notification of the electronic device is shown via a standard gesture image displayed on the electronic device 130. In an embodiment, the standard gesture image is a two dimensional image or a three dimensional image. Moreover, the electronic device 130 determines a wrong position of the writing gesture of the user according to the comparison result. Then, a corresponding position of the standard gesture image corresponding to the wrong position is highlighted. As a result, the user knows the wrong position of his gesture clearly, and the users can adjust the writing gesture by referring to the standard gesture.

In an embodiment, as shown in FIG. 3C. When the electronic device 130 determines that there is difference between the contact position 204 and the second preset position in the preset information according to the comparison result, the electronic device 130 marks a highlight mark 422 in a position of the standard gesture image corresponding to the contact position 204, which is not limited herein.

Figure 4A:
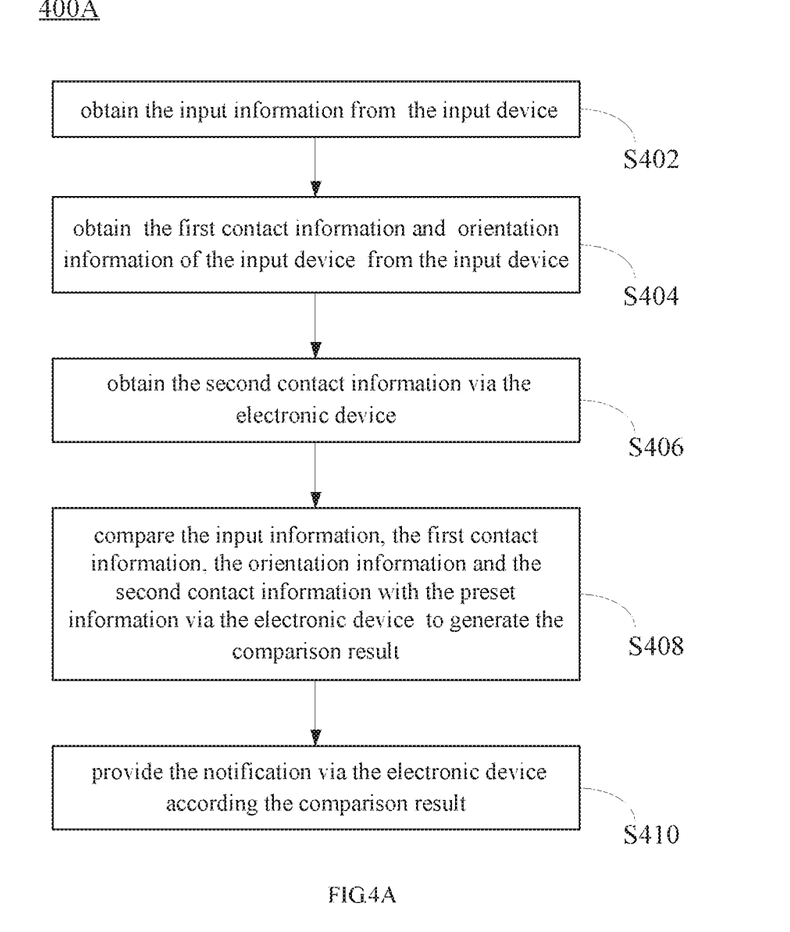
FIG. 4A is a flow chart showing a writing gesture notification method in an embodiment.

FIG. 4A is a flow chart showing a writing gesture notification method 400A in an embodiment. In an embodiment, the writing gesture notification method 400A is implemented in the electronic device 130 of the electronic system 100, which is not limited herein. As show in FIG. 4A, the writing gesture notification method 400A comprises the following steps:

S402: obtaining the input information from the input device 110;

S404: obtaining the first contact information and orientation information of the input device 110 from the input device 110;

S406: obtaining the second contact information via the electronic device 130;

S408: comparing the input information, the first contact information, the orientation information and the second contact information with the preset information via the electronic device 130 to generate the comparison result; and S410: providing the notification via the electronic device 130 according to the comparison result.

The input information, the first contact information, the orientation information and the second contact information is including but not limited to these in the above embodiment.

In an embodiment, please refer to step S408, the writing gesture notification method 400A is executed via the electronic device 130 to compare the input information, the first contact information, the orientation information and the second contact information with the preset information to generate the comparison result. The notification is provided to remind the user to adjust writing gesture according to the comparison result.

In an embodiment, please refer to the step S408. The writing gesture notification method 400A is executed via the electronic device 130 to determine the contact position on the input device 110 according to the first contact information, and compare the contact position with the preset position in the preset information. In an embodiment, when the user operates the input device 110 to write on the sensing panel 132, the user contacts the input device 110 at the contact position 202 and the contact position 204. The electronic device 130 compares the contact position 202 and the contact position 204 with the preset position. Then, the difference between the writing gesture of the user and the preset information is determined to remind the user to adjust the writing gesture. The contact position 202 and the contact position 204 can refer the description in above embodiments, which is not limited herein.

In an embodiment, please continue to refer to step S408. The writing gesture notification method 400A is executed via the electronic device 130 to determine the contact pressure of the contact position where the input device 110 contacts the sensing panel 132 (as shown in FIG. 3A, the contact position 210 between a tip 112 of the input device 110 and the sensing panel 132) according to the first contact information, and compare the contact pressure of the contact position between the input device 110 and the sensing panel 132 with the first preset contact pressure in the preset information to generate the comparison result.

In an embodiment, please continue to refer to step S408. The writing gesture notification method 400A is executed via the electronic device 130 to determine the press pressure of the contact position where the user contacts the input device 110 (as shown in FIG. 3A, the contact position 202 between the user and the input device 110) according to the first contact information, and compare the contact pressure of the contact position between the user and the input device 110 with the second preset contact pressure in the preset information to generate the comparison result.

In an embodiment, please continue to refer to step S408. The writing gesture notification method 400A is executed to determine the incline angle and the incline direction of the input device 110 via the electronic device 130 according to the orientation information, and compare the incline direction and the incline angle with the preset direction and preset angle in the preset information to generate the comparison result. In an embodiment, when the input device 110 is operated, the incline angle and the incline direction are formed between the input device 110 and the horizontal line. The incline angle and the incline direction correspond to the writing gesture of the user. As a result, the electronic device 130 compares the incline angle and the incline direction with the preset direction and preset angle in the preset information. Then, the difference between the writing gesture of the user and the preset information is determined to generate the comparison result.

In an embodiment, please refer to step S408. The writing gesture notification method 400A is executed via the electronic device 130 to calculate the pressure fulcrum on the sensing panel 132 of the electronic device 130 according to the second contact information, and compare the pressure fulcrum with the preset fulcrum with in the preset information. In an embodiment, when the user operates the input device 110 to write on the sensing panel 132, the user contacts the sensing panel 132 at the contact position 206 and the contact position 208. The electronic device 130 calculates the first pressure fulcrum 412 and the second pressure fulcrum 414 according to the panel pressure of the contact position 206 and the contact position 208. Then, the electronic device 130 compares the first pressure fulcrum 412 with the first preset fulcrum in the preset information, and compares the second pressure fulcrum 414 with the second preset fulcrum in the preset information. As a result, the comparison result is generated.

In an embodiment, please continue to refer to step S408. The writing gesture notification method 400A is executed to calculate the panel pressure on the sensing panel 132 of the electronic device 130 via the electronic device 130 according to the second contact information, and compare the panel pressure with the preset panel pressure in the preset information. In an embodiment, the contact sensitive substrate of the electronic device 130 is configured to sense the contact pressure of the contact position 206 and the contact position 208. As a result, the electronic device 130 compares the panel pressure of the contact position 206 and the contact position 208 between the user and the sensing panel 132 with the first preset panel pressure and the second preset panel pressure in the preset information to generate the comparison result.

Figure 4B:
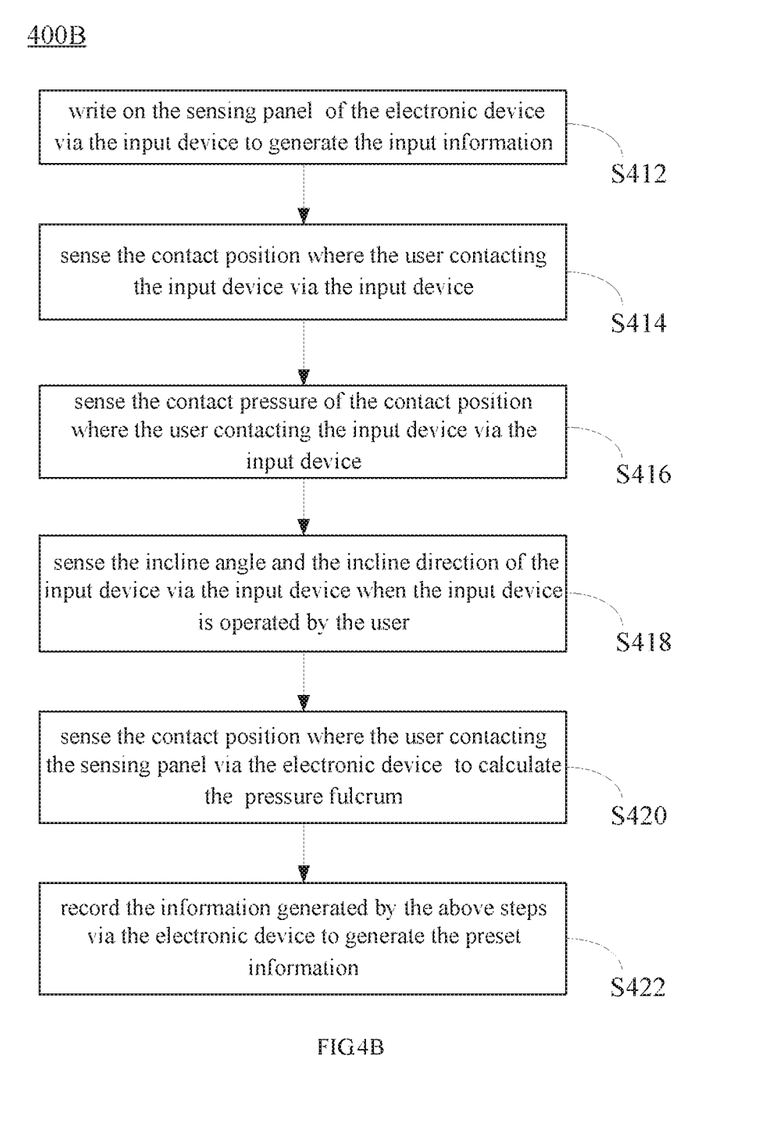
FIG. 4B is a flow chart showing a standard writing gesture detecting method in an embodiment.

FIG. 4B is a flow chart showing a standard writing gesture detecting method 400B in an embodiment. In an embodiment, the standard writing gesture detecting method 400B is configured to generate the preset information. The standard writing gesture detecting method 400B is implemented to the electronic system 100, which is not limited herein. Please refer to FIG. 4B, the standard writing gesture detecting method 400B comprises the following steps:

S412: writing on the sensing panel 132 of the electronic device 130 via the input device 110 to generate the input information;

S414: sensing the contact position where the user contacting the input device 110 via the input device 110;

S416: sensing the contact pressure of the contact position where the user contacting the input device 110 via the input device 110;

S418: sensing the incline angle and the incline direction of the input device 110 via the input device 110 when the input device 110 is operated by the user;

S420: sensing the contact position where the user contacting the sensing panel 132 via the electronic device 130 to calculate the pressure fulcrum; and S422: recording the information generated by the above steps via the electronic device 130 to generate the preset information.

In an embodiment, the standard writing gesture detecting method 400B is operated by the user with the standard writing gesture to generate the preset information. As a result, the writing gesture notification method 400A notices the user to adjust the gesture and strength of holding the stylus according to the preset information. In an embodiment, the standard writing gesture detecting method 400B is executed via the contact sensitive substrate of the electronic device 130 to sense and record the panel pressure of the contact position where the user contacting the sensing panel 132 of the electronic device 130. Then, the preset information is generated.

Figure 4C:
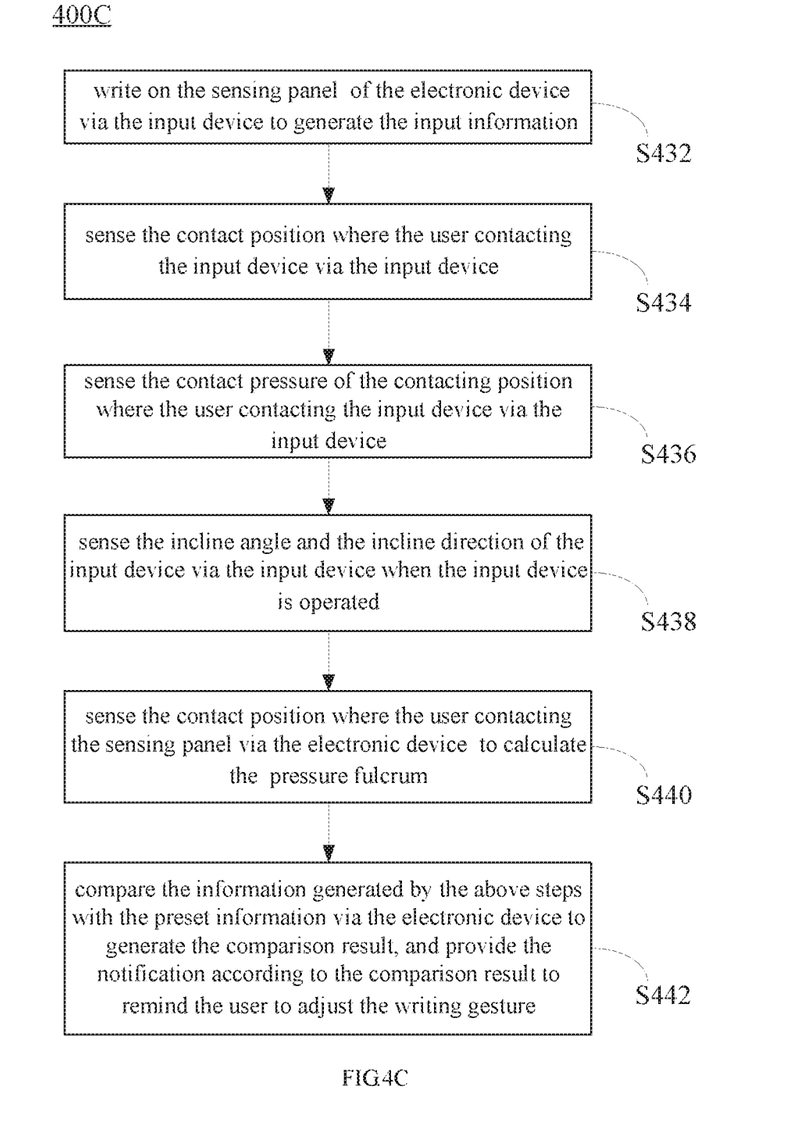
FIG. 4C is a flow chart showing a writing gesture notification method in an embodiment.

FIG. 4C is a flow chart showing a writing gesture notification method 400C in an embodiment. In an embodiment, the writing gesture notification method 400C reminds the user to adjust the writing gesture according to the preset information generated by executing the standard writing gesture detecting method 400B. The writing gesture notification method 400C is implemented to the electronic system 100, which is not limited herein. As shown in FIG. 4C, the writing gesture notification method 400C comprises the following steps:

S432: writing on the sensing panel 132 of the electronic device 130 via the input device 110 to generate the input information;

S434: sensing the contact position where the user contacting the input device 110 via the input device 110;

S436: sensing the contact pressure of the contact position where the user contacting the input device 110 via the input device 110;

S438: sensing the incline angle and the incline direction of the input device 110 via the input device 110 when the input device 10 is operated;

S440: sensing the contact position where the user contacting the sensing panel 132 via the electronic device 130 to calculate the pressure fulcrum; and S442: comparing the information generated by the above steps with the preset information via the electronic device 130 to generate the comparison result, and providing the notification according to the comparison result to remind the user to adjust the writing gesture.

In an embodiment, when a user operates the electronic system 100 without the standard writing gesture, the electronic device 130 executes the writing gesture notification method 400C to compare the information generated by operating the input device 110 on the sensing panel 132 with the preset information stored in the electronic device 130 to generate the comparison result, to remind the user to adjust the writing gesture to the standard writing gesture corresponding to the preset information. In an embodiment, in the standard writing gesture detecting method 400B, the panel of the contact position where the user contacting the sensing panel 132 is sensed via the contact sensitive substrate of the electronic device 130. The panel pressure between the user and the sensing panel 132 is compared with the preset panel pressure in the preset information.

In embodiments, the writing gesture notification method and the electronic system sense the contact information via the electronic device and the input device. The comparison result is generated according to the contact information, the input information and the orientation information of the input device. Then, the notification is provided according to the comparison result. In an embodiment, the contact information is the contact position where the input device contacts the electronic device or the corresponding contact pressure when the input device is operated by the user. The orientation information is the incline angle or the incline direction when the input device is operated by the user. As a result, the writing gesture notification method and the electronic system determines that whether the writing gesture of the user needs to be adjusted according to the contact information of the user, the input information and the orientation information of the input device, and reminds the user to adjust the writing gesture according to the notification provided by the comparison result. As a result, the applications relating to touch input can be expanded via the writing gesture notification method and the electronic system, and the sensing accuracy is also improved.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. A writing gesture notification method, applied to an electronic device of an electronic system, the electronic system includes the electronic device and an input device, the writing gesture notification method comprising:
   obtaining input information from the input device;
   obtaining first contact information and orientation information of the input device from the input device;
   obtaining second contact information via the electronic device, wherein the second contact information includes at least two contact positions where two portions of a hand of a user directly contact the electronic device when the user operates the input device using the hand to write on the electronic device;
   comparing the input information, the first contact information, the orientation information and the second contact information with preset information to generate a comparison result; and
   providing a notification via the electronic device according to the comparison result.

2. The writing gesture notification method according to claim 1, wherein the step of comparing the input information, the first contact information, the orientation information and the second contact information with the preset information to generate the comparison result, further comprises:
   determining a contact position where the input device is touched according to the first contact information via the electronic device, and comparing the contact position with a preset position in the preset information.

3. The writing gesture notification method according to claim 1, wherein the step of comparing the input information, the first contact information, the orientation information and the second contact information with the preset information to generate the comparison result, further comprises:
   determining an incline angle and an incline direction of the input device according to the orientation information via the electronic device, and comparing the incline angle and the incline direction with a preset angle and a preset direction of the preset information.

4. The writing gesture notification method according to claim 1, wherein the step of comparing the input information, the first contact information, the orientation information and the second contact information with the preset information to generate the comparison result, further comprises:
   calculating a pressure fulcrum on a sensing panel of the electronic device according to the second contact information via the electronic device, and comparing the pressure fulcrum with a preset fulcrum in the preset information.

5. The writing gesture notification method according to claim 4, wherein the step of comparing the input information, the first contact information, the orientation information and the second contact information with the preset information to generate the comparison result, comprises:
   calculating a panel pressure on the sensing panel of the electronic device according to the second contact information via the electronic device, and comparing the contact pressure with a preset panel pressure in the preset information.

6. An electronic system, comprising:
   an input device configured to generate input information, first contact information and orientation information of the input device; and
   an electronic device configured to receive the input information, the first contact information and the orientation information from the input device, and sense a second contact information via a sensing panel of the electronic device, wherein the second contact information includes at least two contact positions where two portions of a hand of a user directly contact the electronic device when the user operates the input device using the hand to write on the electronic device, wherein the electronic device compares the input information, the first contact information, the orientation information and the second contact information with a preset information to generate a comparison result, and provides a notification according to the comparison result.

7. The electronic system according to claim 6, wherein the electronic device determines a contact position where the input device is touched according to the first contact position, and compares the contact position with a preset position in the preset information.

8. The electronic system according to claim 6, wherein the electronic device determines an incline angle and an incline direction of the input device according to the orientation information, and compares the incline angle and the incline direction with a preset angle and a preset direction in the preset information.

9. The electronic system according to claim 6, wherein the electronic device calculates a pressure fulcrum on the sensing panel of the electronic device according to the second contact information, and compares the pressure fulcrum with a preset fulcrum in the preset information.

10. The electronic system according to claim 9, wherein the electronic device calculates a panel pressure on the sensing panel of the electronic device according to the second contact information, and compares the contact pressure with a preset panel pressure in the preset information.

* * * * *